(12) United States Patent
Messina et al.

(10) Patent No.: US 8,272,665 B2
(45) Date of Patent: Sep. 25, 2012

(54) SIDE AIR BAG ASSEMBLY FOR VEHICLE SEAT

(75) Inventors: Benedict J. Messina, Warren, MI (US); William J. Paruszkiewicz, Clinton Township, MI (US); Tomas A. Welch, Sr., Ortonville, MI (US); Paul S. Severinski, Brownstown, MI (US); James B. Clauser, Oakland Township, MI (US); Louella A. Patterson, Goodells, MI (US)

(73) Assignee: Lear Corporation, Southfield, MI (US)

( * ) Notice: Subject to any disclaimer, the term of this patent is extended or adjusted under 35 U.S.C. 154(b) by 83 days.

(21) Appl. No.: 13/011,987

(22) Filed: Jan. 24, 2011

(65) Prior Publication Data

US 2012/0187664 A1   Jul. 26, 2012

(51) Int. Cl.
    *B60R 21/16* (2006.01)
(52) U.S. Cl. ............ 280/728.2; 280/730.2; 280/743.1
(58) Field of Classification Search ........... 280/728.2, 280/728.3, 730.2, 743.1
    See application file for complete search history.

(56) References Cited

U.S. PATENT DOCUMENTS

| | | | |
|---|---|---|---|
| 5,498,030 A | 3/1996 | Hill et al. | |
| 5,678,853 A | 10/1997 | Maly | |
| 5,749,597 A | 5/1998 | Saderholm | |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,890,734 A | 4/1999 | Saderholm | |
| 5,927,749 A | 7/1999 | Homier et al. | |
| 5,938,232 A | 8/1999 | Kalandek et al. | |
| 5,967,546 A | 10/1999 | Homier et al. | |
| 5,967,603 A | 10/1999 | Genders et al. | |
| 5,992,878 A | 11/1999 | Narita et al. | |
| 5,997,032 A | 12/1999 | Miwa et al. | |
| 6,045,151 A | 4/2000 | Wu | |
| 6,206,410 B1 | 3/2001 | Brown | |
| 6,237,934 B1 | 5/2001 | Harrell et al. | |
| 6,254,122 B1 | 7/2001 | Wu et al. | |
| 6,352,304 B1 | 3/2002 | Sorgenfrei | |
| 6,467,801 B1 | 10/2002 | Preisler et al. | |
| 6,588,838 B1 | 7/2003 | Dick, Jr. et al. | |
| 7,311,325 B2 * | 12/2007 | Tracht et al. | 280/730.2 |
| 7,322,597 B2 * | 1/2008 | Tracht | 280/728.3 |
| 7,357,412 B2 * | 4/2008 | Tracht et al. | 280/730.2 |
| 7,380,812 B2 * | 6/2008 | Tracht et al. | 280/728.3 |
| 7,458,603 B2 * | 12/2008 | Buono et al. | 280/728.2 |
| 7,637,529 B2 * | 12/2009 | Tracht | 280/728.3 |
| 7,681,907 B2 * | 3/2010 | Svenbrant et al. | 280/728.2 |
| 7,731,226 B2 * | 6/2010 | Zink | 280/730.2 |
| 8,113,539 B2 * | 2/2012 | Paruszkiewicz et al. | 280/728.3 |
| 8,167,333 B2 * | 5/2012 | Tracht et al. | 280/730.2 |
| 8,177,256 B2 * | 5/2012 | Smith et al. | 280/730.2 |

FOREIGN PATENT DOCUMENTS

WO    00/09365 A1    2/2000

* cited by examiner

*Primary Examiner* — Toan To
(74) *Attorney, Agent, or Firm* — Brooks Kushman P.C.

(57) ABSTRACT

A vehicle seat air bag assembly (17) having an air bag module (18) includes an air bag guide (44) that is foldable from a flexible sheet (46) to provide both left and right hand embodiments with connection of distal ends of the flexible sheet to each other after the folding fabrication. The air bag guide (44) guides an air bag (40) of the air bag module (18) during inflation and movement to and through a trim cover deployment seam (34).

10 Claims, 3 Drawing Sheets

SIDE AIR BAG ASSEMBLY FOR VEHICLE SEAT

BACKGROUND

1. Technical Field

This invention relates to a vehicle seat side air bag assembly having an air bag guide for guiding an air bag for deployment during use.

2. Background Art

Vehicle seat components have previously included side air bag modules and conventionally include trim covers that have an air bag deployment seam to which an air bag upon inflation moves through a guide and through which the air bag is projected outwardly from within the seat to provide occupant protection. See, for example, the U.S. Pat. No. 7,637,531 of William J. Paruszkiewicz et al.

Other prior art references noted during an investigation conducted for this invention include U.S. Pat. Nos. 5,498,030 Hill et al.; 5,678,853 Maly; 5,749,597 Saderholm; 5,810,389 Yamaji et al.; 5,816,610 Higashiura et al.; 5,860,673 Hasegawa et al.; 5,890,734 Saderholm; 5,927,749 Homier et al.; 5,938,232 Kalandek et al.; 5,967,546 Homier et al.; 5,967,603 Genders et al.; 5,992,878 Narita et al.; 5,997,032 Miwa et al.; 6,045,151 Wu; 6,206,410 Brown; 6,237,934 Harrell et al.; 6,254,122 Wu et al.; 6,352,304 Sorgenfrei; 6,467,801 Preisler et al.; and 6,588,838 Dick, Jr. et al; and also see PCT publication WO 00/09365 A1.

SUMMARY

An object of the present invention is to provide an improved vehicle seat side air bag assembly for providing seat occupant protection.

In carrying out the above object, a vehicle seat side air bag assembly constructed in accordance with the invention includes a vehicle seat having a frame, a foam pad mounted on the frame, and a trim cover that covers the foam pad and has an air bag deployment seam. An air bag module of the air bag assembly is mounted on the frame and has an inflator and an air bag that is inflated by the inflator to open the deployment seam of the trim cover and extend outwardly therethrough to provide vehicle seat occupant protection. An air bag guide of the air bag assembly is fabricated from a flexible sheet and has an inner extremity that receives the air bag module and an outer extremity located toward the deployment seam of the trim cover so the air bag upon inflation moves to and through the deployment seam of the trim cover. The flexible sheet includes a pair of panels having adjacent ends including a junction and the pair of panels also have opposite distal ends such that the flexible sheet when planar defines an elongated shape. The flexible sheet is folded at the junction and includes a connection that secures the opposite distal ends of the panels to each other. One panel includes a flap that is folded around the air bag module on the opposite side thereof form the deployment seat of the trim cover and has a connection to the other panel. The flexible sheet is foldable about the junction in opposite directions and the flap is foldable in opposite directions so as to be usable for both left and right hand embodiments of the air bag assembly.

The vehicle seat side air bag assembly as disclosed has the flexible sheet made from a synthetic resin and includes stitching that embodies the connection of the opposite distal ends of the pair of panels of the flexible sheet to each other.

The vehicle seat side air bag assembly as disclosed has the distal end of the other panel including a tab that is folded around the distal end of the one panel and at which the stitching embodies the connection of the distal ends of the pair of panels to each other.

The vehicle seat side air bag assembly as disclosed has the air bag module including threaded studs that mount the air bag module on the frame of the seat and that also provide the connection of the flap of the one panel to the other panel.

The vehicle seat side air bag assembly as disclosed includes stitching that embodies the connection of the opposite distal ends of the pair of panels of the flexible sheet to each other, and the air bag module includes threaded studs that mount the air bag module on the frame of the seat and that also embody the connection of the flap of the one panel to the other panel.

Also, the flap of the one panel and the other panel have holes that are aligned to receive the threaded studs upon mounting of the air bag module on the frame. Furthermore, the one panel has holes that are aligned with the holes of the other panel upon folding of the flexible sheet at the junction.

The vehicle seat air bag assembly as disclosed is mounted within a vehicle seat back of a vehicle seat on a frame of the vehicle seat back.

The objects, features and advantages of the present invention are readily apparent from the following detailed description of the preferred embodiments when taken in connection with the accompanying drawings.

DETAILED DESCRIPTION OF THE EMBODIMENT

Figure 1:
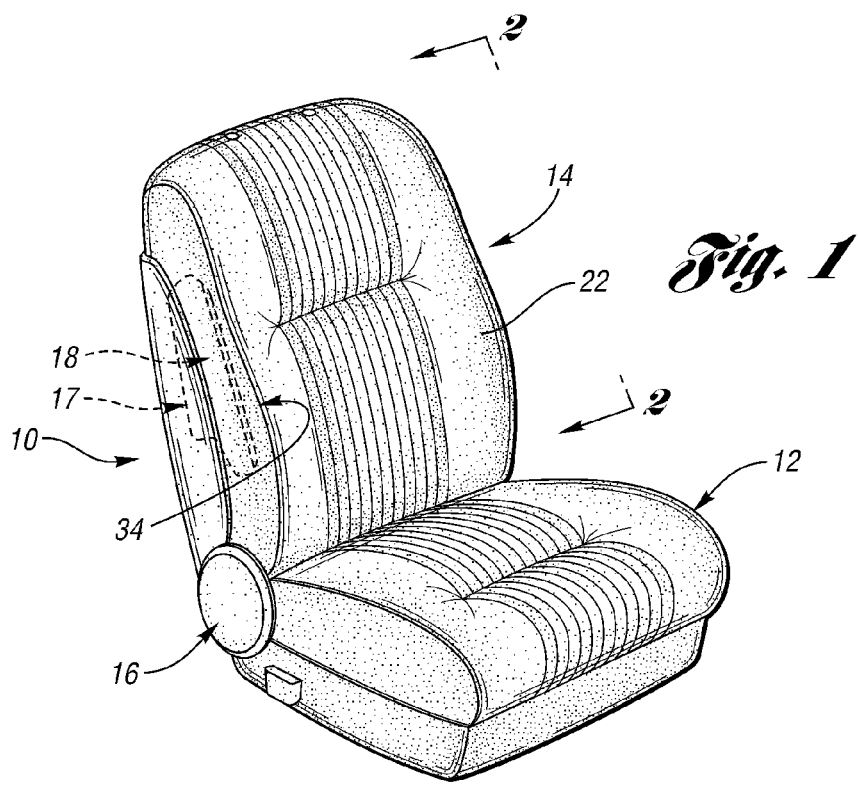
FIG. 1 is a perspective view of a vehicle seat side air bag assembly including a seat back component constructed in accordance with the invention to include a side air bag module that is shown by hidden line illustration.
Figure 2:
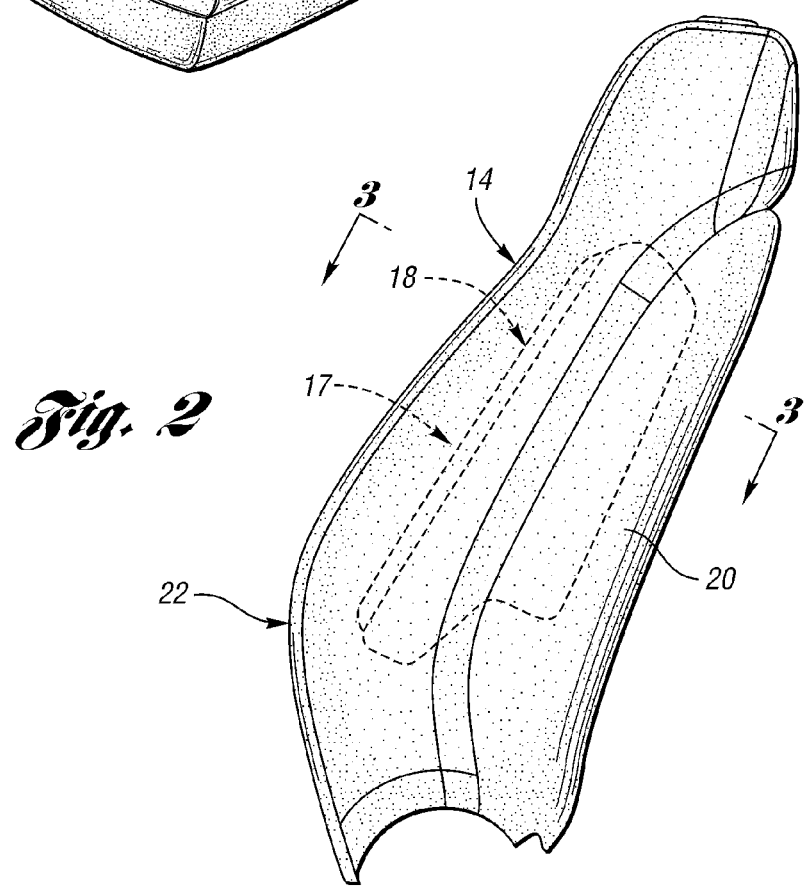
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag assembly 17 that is constructed in accordance with the present invention and includes a side air bag module 18 operable to provide seat occupant protection as is hereinafter more fully described. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
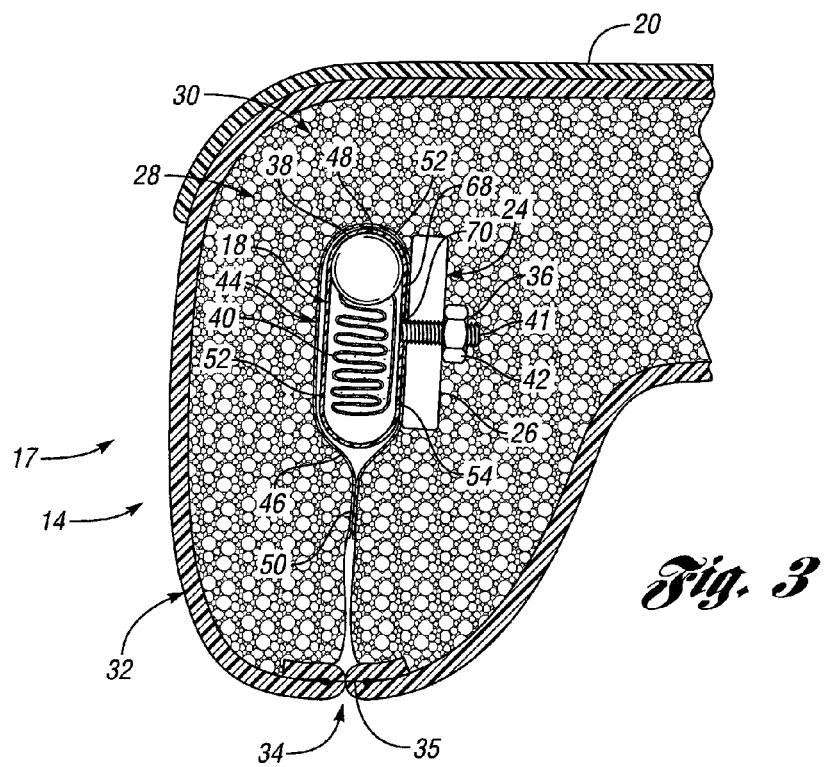
FIG. 3 is a partial sectional view taken along the direction of line 3-3 in FIG. 2 to illustrate the manner in which the air bag module is mounted within the seat.

As illustrated in FIG. 3, the seat back component 14 includes a frame collectively identified by 24 and having a pair of frame members 26 (only one shown) at its opposite lateral sides. A foam pad 28 is mounted on the frame 24 in any conventional manner and has opposite side extremities 30 (only one shown) spaced laterally from each other at the opposite lateral sides of the seat. A trim cover generally indicated by 32 extends over the foam pad 28 and includes an air bag deployment or release seam 34 adjacent the shown side extremity 30 of the foam pad which corresponds to an outboard location. The deployment seam 34 includes stitching 35 of trim cover portions to each other.

The side air bag module 18 is located within the trim cover 32 mounted on the frame 24, specifically by a threaded connection 36 on the one side frame member 26 adjacent the air bag release seam 34 but in an inwardly spaced relationship from the release seam. The air bag module 18 includes an inflator 38 and a schematically illustrated air bag 40 which may be folded or rolled, and upon deployment, the air bag is inflated by the inflator and projected outwardly from the seat component through the air bag deployment seam 34 of the trim cover 32 that may be made of cloth, vinyl or leather, etc. The threaded connection 36 includes a pair of threaded studs 41 (shown in FIG. 6) each of which extends through the frame 24 as shown in 3 and receives an associated nut 42 on the opposite side of the frame to provide the mounting of the air bag module 18.

As shown in FIG. 3, the side air bag assembly 17 includes an air bag guide 44 that is fabricated from a flexible sheet 46 as is hereinafter more fully described. More specifically, the air bag guide 44 after completion of its fabrication has an inner extremity 48 that receives the air bag module 18 and has an outer extremity 50 located toward the deployment seam 34 of the trim cover 32 so the air bag upon inflation moves to and through the deployment seam of the trim cover in order to provide occupant protection.

Figure 4:
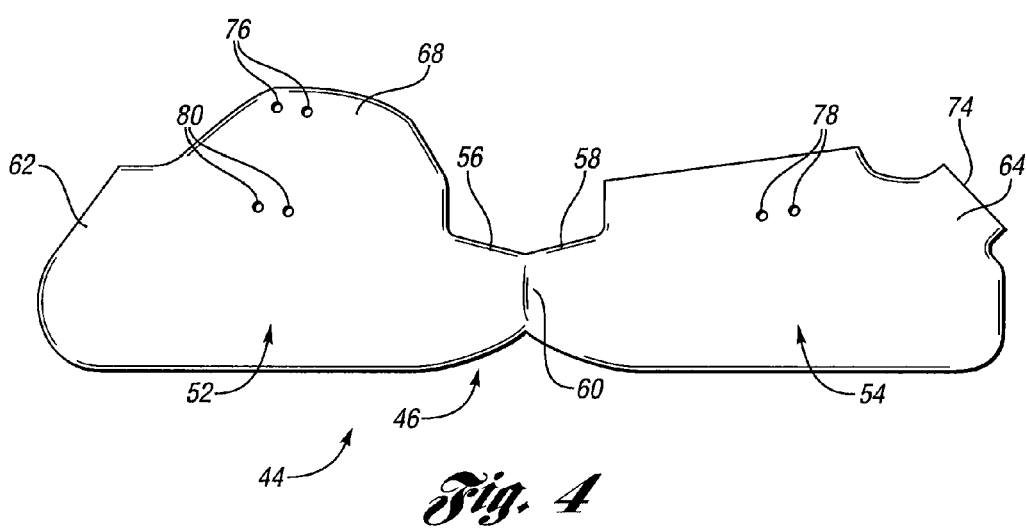
FIG. 4 is a view illustrating an air bag guide that is folded to receive the air bag module and that guides an air bag thereof upon inflation to a deployment seam of a trim cover of the seat.
Figure 6:
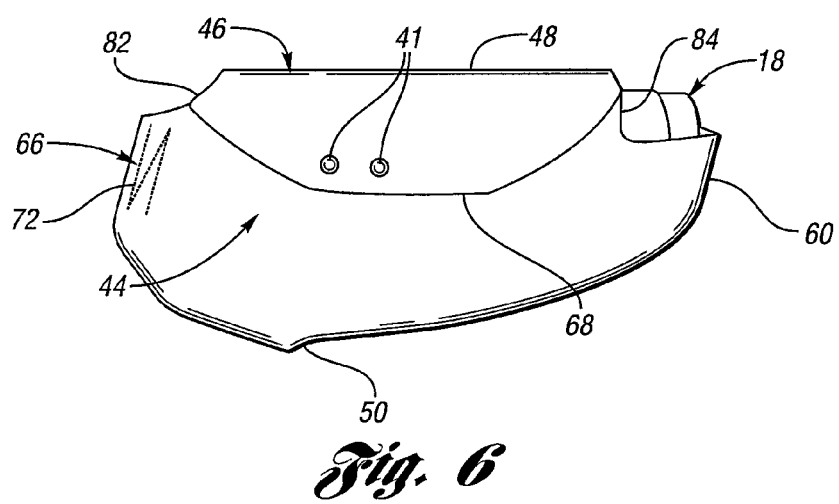
FIG. 6 is a perspective view illustrating the air bag guide folded to receive the air bag module.

The flexible sheet 46 shown in FIG. 4 is made from a synthetic resin such as a thermoplastic polyolefin. The flexible sheet includes a pair of panels 52 and 54 having respective adjacent ends 56 and 58 including a junction 60. Furthermore, the flexible sheet 46 includes a pair of opposite distal ends 62 and 64 such that the flexible sheet when planar as shown in FIG. 4 defines an elongated shape. Upon fabrication, the flexible sheet 46 is folded at the junction 60 and, as shown in FIG. 6, includes a connection 66 that secures the opposite distal ends to each other. The one panel 52 includes a flap 68 that is folded around the air bag module on the opposite side thereof from the deployment seam 34 of the trim cover 32 and has a connection 70 to the other panel 54.

Figures 5A, 5B:
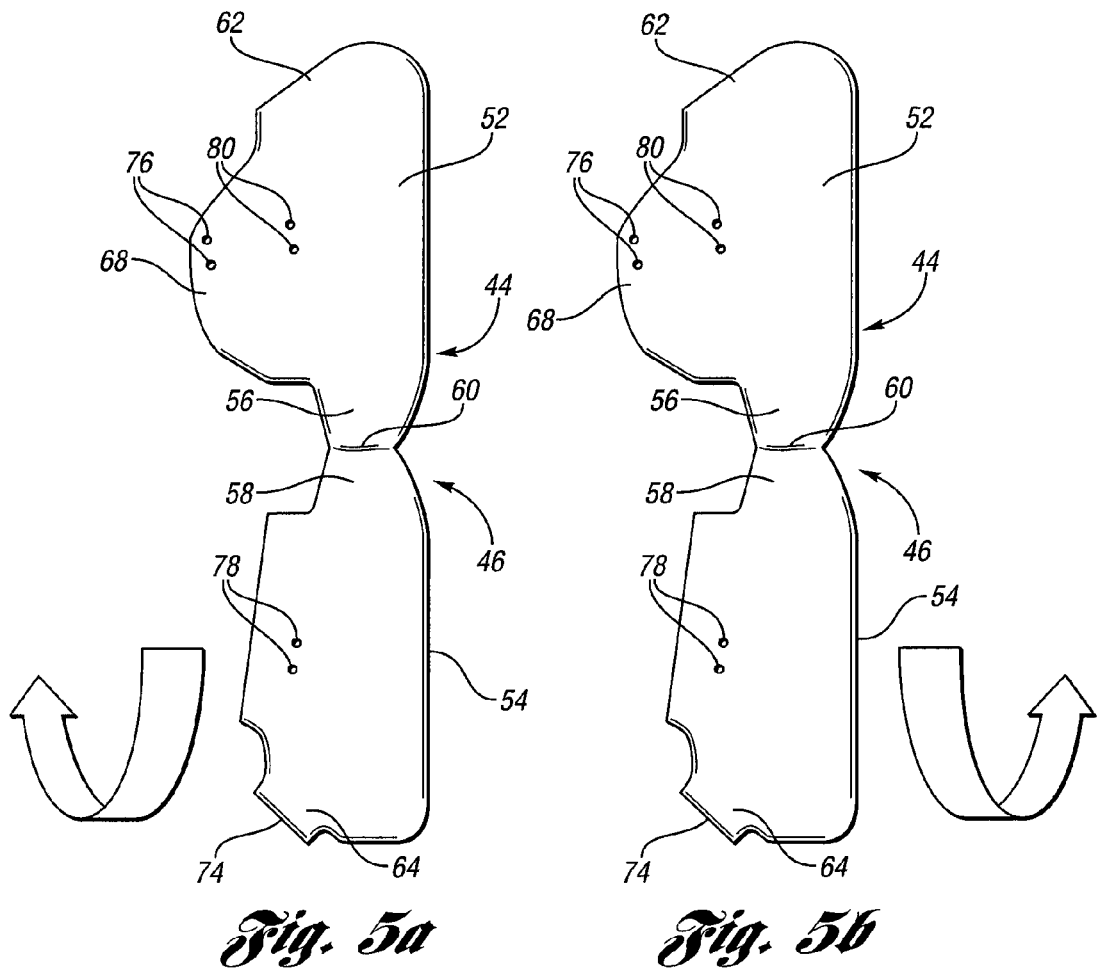
FIGS. 5a and 5b are views that illustrate the manner in which the air bag guide can be folded in opposite directions for use as both left hand and right hand embodiments.

As shown in FIGS. 5a and 5b, the flexible sheet 46 is foldable about the junction 60 in opposite directions and the flap 68 is also foldable in opposite directions so the folded sheet is usable for both left and right hand embodiments of the air bag assembly. More specifically, as illustrated in FIG. 5a, the panel 54 is foldable upwardly over the top of the panel 52 and the flap 68 is then folded over the panel 54 to provide the inner extremity of the air bag guide. As illustrated in FIG. 5b, the panel 54 is foldable under the panel 52 and the flap 68 is then folded under the panel 54 to provide the inner extremity of the air bag guide.

As shown in FIG. 6, the air bag guide 64 includes stitching 72 that embodies the connection 66 of the distal ends of the pair of panels of the flexible sheet to each other. More specifically, the distal end 64 of the other panel 54 includes a tab 74 that is folded around the distal end 62 of the one panel 52 and at which the stitching 72 embodies the connection 66 of the distal ends of the pair of panels to each other. This tab 74 as disclosed is foldable in opposite directions like the panels 52 and 54 and the flap 68 so as to extend around the distal end of the panel 52 in order to provide both the left and right hand embodiments of the air bag guide.

As shown in FIGS. 4, 5a and 5b, the flap 68 of the one panel 52 includes a pair of holes 76 and the other panel 54 includes a pair of holes 78 that are aligned with the holes 76 after the folding described above so as to receive the threaded studs 41 (FIGS. 3 and 6) that embody the connection 70 upon mounting of the air bag module on the frame. Furthermore, the one panel 52 includes a pair of holes 80 that are aligned with the holes 78 of the other panel 54 upon folding in order to provide folding about the junction 60 at the design location so that the flap holes 76 will align with the holes 78 after the flap 74 has been stitched to provide the connection 66 shown in FIG. 6.

After its folding fabrication as shown in FIG. 6, the air bag guide 46 has openings 82 and 84 at the ends of the flap 68, through which control wires can extend to the air bag module 18 to initiate its actuation for inflation of its air bag.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A vehicle seat side air bag assembly comprising:
    a vehicle seat having a frame, a foam pad mounted on the frame, and a trim cover that covers the foam pad and has an air bag deployment seam;
    an air bag module mounted on the frame and having an inflator and an air bag that is inflated by the inflator to open the deployment seam of the trim cover and extend outwardly therethrough to provide vehicle seat occupant protection; and
    an airbag guide that is fabricated from a flexible sheet and has an inner extremity that receives the air bag module and an outer extremity located toward the deployment seam of the trim cover so the air bag upon inflation moves to and through the deployment seam of the trim cover, the flexible sheet including a pair of panels having adjacent ends including a junction and the pair of panels also having opposite distal ends such that the flexible sheet when planar defines an elongated shape, the flexible sheet being folded at the junction and including a connection that secures the opposite distal ends to each other, one panel including a flap that is folded around the air bag module on the opposite side thereof from the deployment seam of the trim cover and having a connection to the other panel, and the flexible sheet being foldable about the junction in opposite directions and the flap being foldable in opposite directions so as to be usable for both left and right hand embodiments of the air bag assembly.

2. A vehicle seat side air bag assembly as in claim 1 wherein the flexible sheet is made from a synthetic resin.

3. A vehicle seat side air bag assembly as in claim 1 which includes stitching that embodies the connection of the opposite distal ends of the pair of panels of the flexible sheet to each other.

4. A vehicle seat side air bag assembly as in claim 3 wherein the distal end of the other panel includes a tab that is folded around the distal end of the one panel and at which the stitching embodies the connection of the distal ends of the pair of panels to each other.

5. A vehicle seat side air bag assembly as in claim 1 wherein the air bag module includes threaded studs that mount the air bag module on the frame of the seat and that also embody the connection of the flap of the one panel to the other panel.

6. A vehicle seat side air bag assembly as in claim 5 wherein the flap of the one panel and the other panel have holes that are aligned to receive the threaded studs upon mounting of the air bag module on the frame.

7. A vehicle seat side air bag assembly as in claim 5 wherein the one panel has holes that are aligned with the holes of the other panel upon folding of the flexible sheet at the junction.

8. A vehicle seat side air bag assembly as in claim 1 which includes stitching that embodies the connection of the opposite distal ends of the flexible sheet to each other, and the air bag module including threaded studs that mount the air bag module on the frame of the seat and that also embody the connection of the flap of the one panel to the other panel.

9. A vehicle seat side air bag assembly comprising:
a vehicle seat having a frame, a foam pad mounted on the frame, and a trim cover that covers the foam pad and has an air bag deployment seam;
an air bag module including threaded studs providing mounting thereof on the frame, and the air bag module having an inflator and an air bag that is inflated by the inflator to open the deployment seam of the trim cover and extend outwardly therethrough to provide vehicle seat occupant protection; and
an airbag guide that is fabricated from a flexible sheet and has an inner extremity that receives the air bag module and an outer extremity located toward the deployment seam of the trim cover so the air bag upon inflation moves to and through the deployment seam of the trim cover, the flexible sheet including a pair of panels having adjacent ends including a junction and the pair of panels also having opposite distal ends such that the plastic sheet when planar defines an elongated shape, the plastic sheet being folded at the junction and including stitching that embodies a connection that secures the opposite distal ends to each other, one panel including a flap that is folded around the air bag module on the opposite side thereof from the deployment seam of the trim cover with the threaded studs of the air bag module embodying a connection of the flap to the other panel, the distal end of the other panel including a tab that is folded around the distal end of the one panel and at which the stitching embodies the connection of the distal ends of the panels to each other, and the plastic sheet being foldable about the junction in opposite directions and the flap and the tab being foldable in opposite directions so as to be usable for both left and right hand embodiments of the air bag assembly.

10. A vehicle seat side air bag assembly comprising:
a vehicle seat including a seat back having a frame, a foam pad mounted on the frame, and a trim cover that covers the foam pad and has an air bag deployment seam;
an air bag module including threaded studs providing mounting thereof on the frame, and the air bag module having an inflator and an air bag that is inflated by the inflator to open the deployment seam of the trim cover and extend outwardly therethrough to provide vehicle seat occupant protection; and
an airbag guide that is fabricated from a synthetic resin flexible sheet and has an inner extremity that receives the air bag module and an outer extremity located toward the deployment seam of the trim cover so the air bag upon inflation moves to and through the deployment seam of the trim cover, the flexible sheet including a pair of panels having adjacent ends including a junction and the pair of panels also having opposite distal ends such that the plastic sheet when planar defines an elongated shape, the plastic sheet being folded at the junction and including stitching that embodies a connection that secures the opposite distal ends to each other, one panel including a flap that is folded around the air bag module on the opposite side thereof from the deployment seam of the trim cover with the threaded studs of the air bag module embodying a connection of the flap to the other panel, the distal end of the other panel including a tab that is folded around the distal end of the one panel and at which the stitching embodies the connection of the distal ends of the panels to each other, the flap of the one panel and the other panel having holes that are aligned to receive the threaded studs upon mounting of the air bag module on the frame, the one panel having holes that are aligned with the holes of the other panel upon folding of the flexible sheet at the junction, and the plastic sheet being foldable about the junction in opposite directions and the flap and the tab being foldable in opposite directions so as to be usable for both left and right hand embodiments of the air bag assembly.

* * * * *